(12) United States Patent
Shin

(10) Patent No.: US 7,301,556 B2
(45) Date of Patent: Nov. 27, 2007

(54) IMAGE SIGNAL TRANSMITTING/RECEIVING APPARATUS AND METHOD BASED ON A CUT-OFF MODE

(75) Inventor: Kyoung Sup Shin, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 682 days.

(21) Appl. No.: 09/917,722

(22) Filed: Jul. 31, 2001

(65) Prior Publication Data
US 2002/0054239 A1 May 9, 2002

(30) Foreign Application Priority Data
Aug. 1, 2000 (KR) ................................ 2000-44641

(51) Int. Cl.
*H04N 7/14* (2006.01)
*H04N 1/00* (2006.01)
*H04N 5/225* (2006.01)

(52) U.S. Cl. ................. 348/14.12; 348/211.5; 348/552; 455/556.1; 455/557

(58) Field of Classification Search ............. 348/207.1, 348/211.5, 211.6, 552, 14.13, 14.02, 14.04, 348/14.05, 14.07, 14.08, 14.12; 455/556, 455/557, 556.1
See application file for complete search history.

(56) References Cited

U.S. PATENT DOCUMENTS

| | | | | |
|---|---|---|---|---|
| 5,164,831 A | * | 11/1992 | Kuchta et al. | 348/231.7 |
| 5,389,965 A | * | 2/1995 | Kuzma | 348/14.05 |
| 6,011,537 A | * | 1/2000 | Slotznick | 715/733 |
| 6,137,485 A | * | 10/2000 | Kawai et al. | 715/719 |
| 6,618,553 B1 | * | 9/2003 | Shiohara | 386/117 |
| 6,714,238 B2 | * | 3/2004 | Urisaka et al. | 348/211.99 |
| 6,801,719 B1 | * | 10/2004 | Szajewski et al. | 396/333 |
| 6,919,923 B1 | * | 7/2005 | Tanaka et al. | 348/220.1 |

* cited by examiner

*Primary Examiner*—Ngoc-Yen Vu
*Assistant Examiner*—Carramah J Quiett
(74) *Attorney, Agent, or Firm*—Ked & Associates, LLP

(57) ABSTRACT

The present invention relates to an image signal transmitting/receiving apparatus and method for selectively performing transmission and display of a main image signal. The present invention transmits and display an sub-image signal instead of the received main image signal in case that the cut-off mode with respect to the main image signal has been set.

9 Claims, 3 Drawing Sheets

IMAGE SIGNAL TRANSMITTING/RECEIVING APPARATUS AND METHOD BASED ON A CUT-OFF MODE

BACKGROUND OF THE INVENTION

1. Field of the Invention

The present invention relates to an image communication terminal, and more particularly, to an image signal transmitting/receiving apparatus and method for selectively performing transmission and display of a main image signal.

2. Description of the Background Art

Thanks to its handy portability and convenience in use, a mobile communication terminal is widely used. With its functions for phone book registration, memorandum and a days schedule, the mobile communication terminal is being developed to a means for managing personal information.

FIG. 1 illustrates an image signal transmitting and receiving apparatus having an image communication terminal (referred to as 'terminal', hereinafter) in accordance with a conventional art.

As shown in FIG. 1, the conventional image signal transmitting/receiving apparatus includes an image input unit 101 for inputting a main image signal, an encoder 102 for encoding the main image signal inputted through the image input unit 101, an image signal processor 103 for processing the encoded main image signal and transmitting it to a terminal of a receiving party, and processing the main image signal received from the terminal of the receiving party, a decoder 104 for decoding the main image signal received through the image signal processor 103, and an image signal display unit 105 for displaying the decoded main image signal on an LCD.

The operation of the conventional image signal transmitting and receiving apparatus constructed as described above will now be explained with reference to the accompanying drawings.

A main image signal inputted through the image signal input unit 101 is encoded by the encoder 102 and then inputted to the image signal processor 103. The image signal processor 103 processes the encoded main image signal and transmits it to the terminal of the receiving party, and processes the main image signal received from the terminal of the receiving party and outputs it to the decoder 104. The decoder 104 decodes the main image signal outputted from the image signal processor 103 and outputs it to the image signal display unit 105, so that the received main image signal is displayed on the LCD of the terminal.

While making an image communication by using the terminal, the user may not want to transmit the main image(his or her own image) to the other party, or display the image transmitted from the other party. At this time, the conventional terminal has shortcomings that the user should discontinue the telephone call in order to cut the main image to be transmitted or not to display the received image.

SUMMARY OF THE INVENTION

Therefore, an object of the present invention is to provide an image signal transmitting/receiving apparatus and method that is capable of selectively transmitting and displaying a main image signal.

To achieve these and other advantages and in accordance with the purpose of the present invention, as embodied and broadly described herein, there is provided an image signal transmitting/receiving method including the steps of: inputting a first image signal; checking whether a cut-off mode has been set for the first image signal; and transmitting and displaying a second image signal instead of the first image signal if the cut-off mode is set for the first image signal.

To achieve the above object, there is further provided an image signal transmitting/receiving apparatus including: an image signal processor for processing a main image signal; a display unit for displaying the received main image signal; a controller for checking whether a cut-off mode has been set for the main image signal; and an image signal selector for selectively outputting a sub-image signal instead of the main image signal to the image signal processor or the display unit in case that the cut-off mode has been set.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
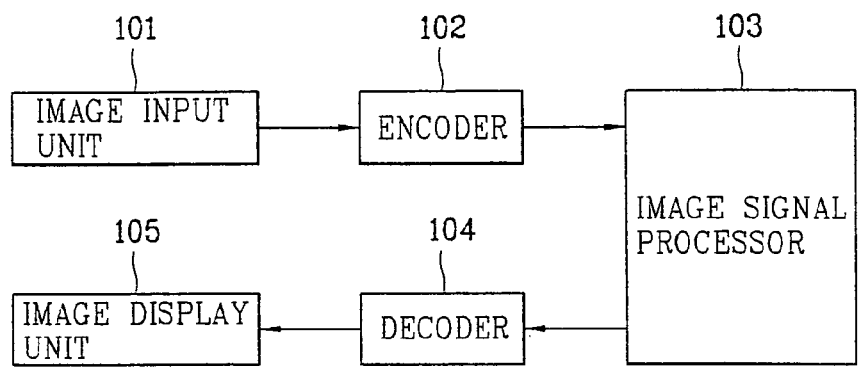
FIG. 1 is a schematic block diagram of an image signal transmitting and receiving apparatus in accordance with a conventional art.
Figure 2:
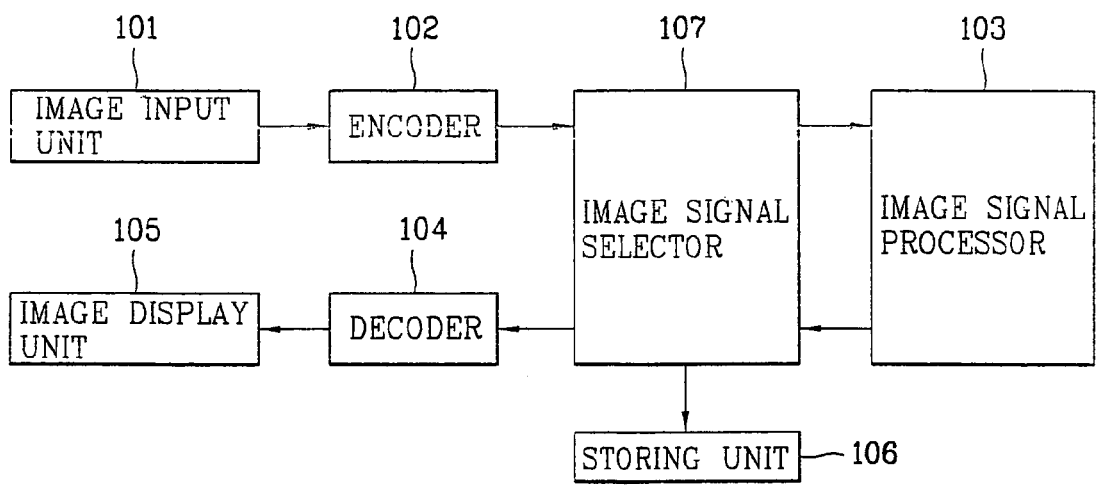
FIG. 2 is a schematic block diagram of an image signal transmitting and receiving apparatus in accordance with a preferred embodiment of the present invention.

As shown in FIG. 2, an image signal transmitting/receiving apparatus of an image communication terminal (termed to as 'terminal', hereinafter) in accordance with a preferred embodiment of the present invention includes a storing unit 106 for storing a sub-image signal and an image signal selector 107 for selectively outputting a main image signal encoded by an encoder 102 or the sub-image signal stored in the image signal storing unit under the control of a controller (not shown), which are additional to the conventional image signal transmitting and receiving apparatus as shown in FIG. 1.

Figure 3:
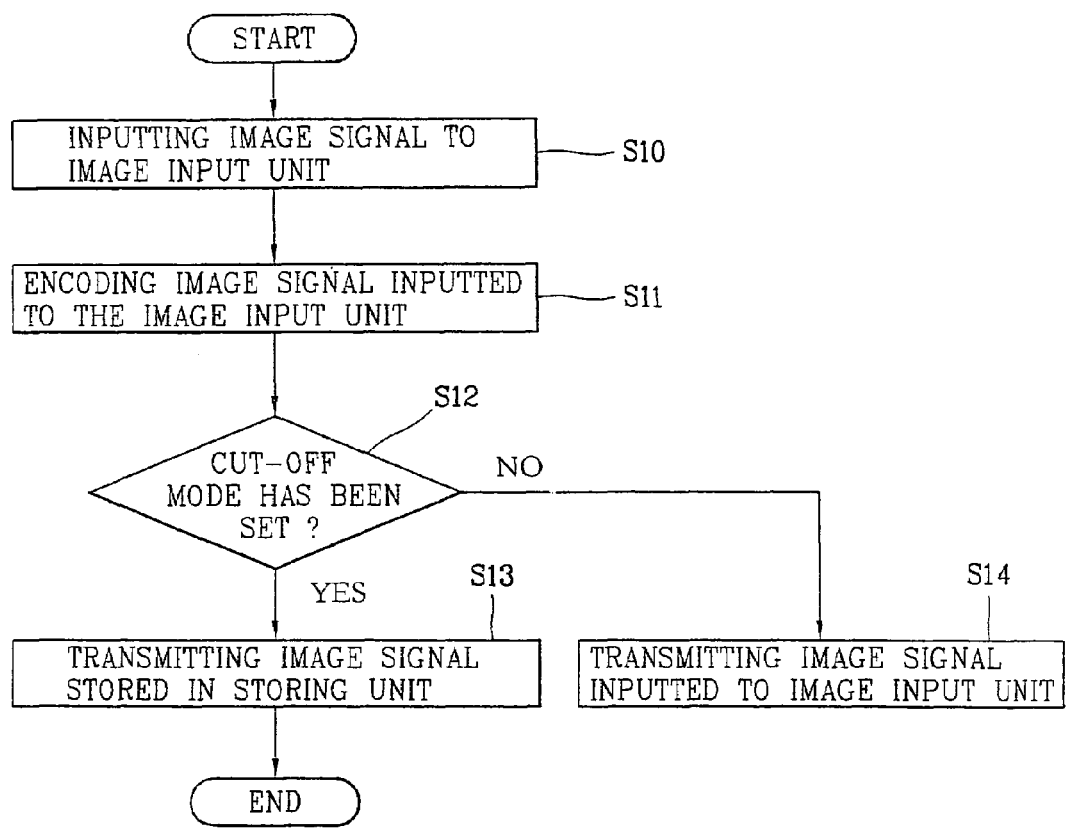
FIG. 3 is a flow chart of a method for selectively transmitting a main image signal of FIG. 2 in accordance with the preferred embodiment of the present invention.
Figure 4:
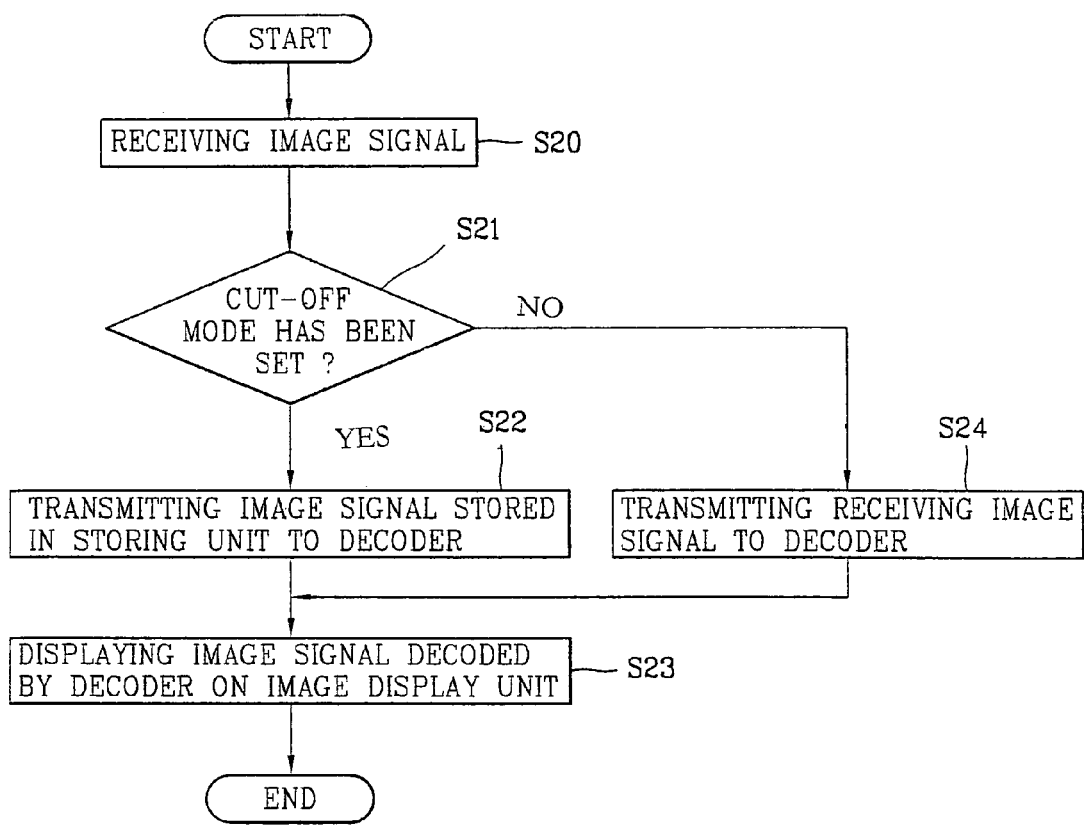
FIG. 4 is a flow chart of a method for selectively displaying a main image signal of FIG. 2 in accordance with the preferred embodiment of the present invention

The operation of the image signal transmitting and receiving apparatus constructed as described above will now be explained with reference to FIGS. 2 to 4.

A user sets a cut-off mode for a main image signal to be transmitted and a received image signal by setting a menu of a terminal or a key inputting at the initial stage or during telephonic communication.

When the main image signal to be transmitted (referred to as a transmission image signal) is inputted (step S10), the main image signal is encoded by the encoder 102 (step S11).

A controller (not shown) checks whether a cut-off mode has been set for the main image signal step S12). In case that the cut-off mode has been set, the controller controls the selector 107 so that a sub-image signal stored in the image signal storing unit 106 can be outputted to the image processor 103 (step S13).

At this time, as for the sub-image signal stored in the image signal storing unit 106, a predetermined image signal stored by the user or the main image signal previously transmitted through the image signal processor 103 can be repeatedly used.

Accordingly, as the image signal processor 103 processes the sub-image signal stored in the image signal storing unit 106 and transmits it, the user can cut off the main image from being transmitted to the other party during a telephonic communication.

Meanwhile, in case that the cut-off mode has not been set, the controller controls the image signal selector 107, so that the main image signal outputted from the encoder 102 can be outputted through the image signal processor 103 (step S14).

When a main image signal is received from the terminal of the other party (step S20), the controller checks whether the cut-off mode has been set for the main image signal (step S21).

In case that the cut-off mode has been set for the main image signal, the controller controls the image signal selector 107, so that the sub-image signal stored in the image signal storing unit 106 can be outputted to the decoder 102 (step S22).

Then, as the decoder 102 processes the sub-image signal stored in the image signal storing unit 106 and transmits it, the user can cut off the main image of the other party from being displayed during a telephonic communication (step S23).

Meanwhile, in case that the cut-off mode has not been set, the controller controls the image signal selector 107, so that the received main image signal can be outputted through the image signal processor 103 to the decoder 102 likewise in the conventional art (step S24).

As so far described, according to the image signal transmitting/receiving apparatus and method of the present invention, the main image signal can be selectively transmitted ad displayed. Thus, the user can transmit and display the main image signal as necessary without being interrupted during the telephonic communication.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method in a mobile communications terminal for transmitting an image signal between at least a first mobile communications terminal and a second mobile communications terminal while in a telephonic communication, the mobile communications terminal comprising an image input unit, an encoder for encoding an image from the image input unit, a storing unit for storing an image, an image signal processor and an image selector, the method comprising:

selectively transmitting during the telephonic communication one of a first image signal captured by the image input unit of the first mobile communications terminal or a second image signal stored in the storing unit of the first mobile communications terminal to the second mobile communications terminal depending on a user's setting of the first mobile communications terminal;

detecting whether a cut-off mode has been selected by the user of the first mobile communications terminal;

if the cut-off mode is set, transmitting the second image signal as a main image signal to the second mobile communications terminal during the telephonic communication; and transmitting the first image signal as the main image signal to the second mobile communications terminal during the telephonic communication if the cut-off mode is not selected by the user.

2. The method of claim 1, wherein the second image signal comprises at least one of an image signal stored by the user and the previously transmitted first image signal.

3. The method of claim 1, wherein the user sets the cut-off mode for the main image signal to be transmitted by operating an input unit of the first mobile communications terminal.

4. A mobile communication terminal comprising:

an image input unit, the image input unit capturing a first image signal;

an encoder, the encoder encoding the first image signal captured by the image input unit;

a memory unit, the memory unit storing a second image signal inputted by a user;

an image signal selector, the image signal selector selectively outputting the first image signal or the second image signal; and a controller cooperating with the image input unit, the encoder, the memory unit and the image signal selector to selectively transmit during a telephonic communication the first image signal or the second image signal to a second mobile communication terminal depending on a user's setting, wherein the controller is configured to:

detect whether a cut-off mode has been set by the user, transmit the second image signal as the main image signal to the second mobile communication terminal during the telephonic communication if the cut-off mode is set, and transmit the first image signal as the main image signal to the second mobile commumcation terminal during the telephonic commumcation if the cut-off mode is not selected by the user.

5. The terminal of claim 4, further comprising an input unit operated by the user to select the cut-off mode.

6. The terminal of claim 5, wherein the cut-off mode is set via menu selection or key inputting of the mobile communication terminal.

7. The terminal of claim 4, wherein the second image signal comprises at least one of an image signal stored by the user and the previously transmitted first image signal.

8. The terminal of claim 4, wherein the cut-off mode is set at an initial stage or during telephonic communication.

9. The terminal of claim 4, wherein the cut-off mode refers to allowing the user to cut off or prevent an image from being transmitted or displayed to another party.

* * * * *